(12) United States Patent
Ueda et al.

(10) Patent No.: US 12,200,411 B2
(45) Date of Patent: Jan. 14, 2025

(54) INFORMATION PROCESSING APPARATUS AND PROJECTION SYSTEM

(71) Applicant: NTT DOCOMO, INC., Chiyoda-ku (JP)

(72) Inventors: Kensuke Ueda, Chiyoda-ku (JP); Nobutaka Matsushima, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 480 days.

(21) Appl. No.: 17/775,489

(22) PCT Filed: Nov. 11, 2020

(86) PCT No.: PCT/JP2020/042059
§ 371 (c)(1),
(2) Date: May 9, 2022

(87) PCT Pub. No.: WO2021/095761
PCT Pub. Date: May 20, 2021

(65) Prior Publication Data
US 2022/0400239 A1 Dec. 15, 2022

(30) Foreign Application Priority Data
Nov. 15, 2019 (JP) ................ 2019-206662

(51) Int. Cl.
H04N 9/31 (2006.01)
G03B 21/00 (2006.01)
G06T 7/70 (2017.01)
(52) U.S. Cl.
CPC ........... H04N 9/3194 (2013.01); G03B 21/00 (2013.01); G06T 7/70 (2017.01)

(58) Field of Classification Search
CPC ...... H04N 9/3194; H04N 9/3185; G06T 7/70; G06V 20/20; G03B 21/00; G06F 3/0481;
(Continued)

(56) References Cited

U.S. PATENT DOCUMENTS

2012/0098852 A1* 4/2012 Kuribayashi ........ H04N 9/3179
345/592
2015/0138236 A1* 5/2015 Koga ................... G06F 3/0304
345/633
(Continued)

FOREIGN PATENT DOCUMENTS

JP 2012-98705 A 5/2012
JP 2013-152529 A 8/2013

OTHER PUBLICATIONS

Japanese Office Action issued on Apr. 4, 2023 in Japanese Patent Application No. 2021-556119 (with unedited computer-generated English translation), 7 pages.
(Continued)

Primary Examiner — Magda Cruz
(74) Attorney, Agent, or Firm — Oblon, McClelland, Maier & Neustadt, L.L.P.

(57) ABSTRACT

An information processing apparatus includes a recognizer, based on captured image information generated by capturing a region on which a first image including an individual image is projected from a projector, to recognize an obstacle between the region and the projector, an identifier, when the obstacle is recognized, to identify, based on first image information indicating the first image and a recognition result by the recognizer, the individual image of which projection is blocked by the obstacle as a specific image, a decider to decide changing a first position in the region on which the specific image is projected to a second position in the region toward which projection of the specific image is not blocked by the obstacle, and a generator to generate
(Continued)

second image information indicating a second image including an auxiliary image teaching association between the specific image located at the second position and the object.

11 Claims, 8 Drawing Sheets

(58) Field of Classification Search
CPC .. G09G 5/00; G09G 5/22; G09G 5/36; G09G 5/377; G09G 5/38
See application file for complete search history.

(56) References Cited

U.S. PATENT DOCUMENTS

| | | | |
|---|---|---|---|
| 2015/0356760 A1* | 12/2015 | Hung | H04N 9/3173 345/173 |
| 2016/0191868 A1* | 6/2016 | Fujiune | H04N 9/3179 348/759 |
| 2016/0337626 A1* | 11/2016 | Mima | H04N 9/3194 |
| 2017/0223319 A1* | 8/2017 | Suzuki | G09G 5/00 |

OTHER PUBLICATIONS

International Search Report mailed on Dec. 22, 2020 in PCT/JP2020/042059 filed on Nov. 11, 2020 (2 pages).

* cited by examiner

INFORMATION PROCESSING APPARATUS AND PROJECTION SYSTEM

TECHNICAL FIELD

The present invention relates to an information processing apparatus and to a projection system.

BACKGROUND ART

There have been conventionally proposed projection systems using a projection apparatus and an image capturing apparatus. For example, in a projection system disclosed in Patent Document 1, an image is projected from a projection apparatus on an upper surface of a table. When an obstacle, which is positioned between the upper surface of the table and the projection apparatus, is recognized based on a captured image obtained by an image capturing apparatus photographically capturing the upper surface of the table, the projection apparatus projects the image on the upper surface of the table while avoiding the obstacle.

RELATED ART DOCUMENT

Patent Document

Patent Document 1: Japanese Patent Application Laid-Open Publication No. 2013-152529.

SUMMARY OF THE INVENTION

Problem to be Solved by the Invention

However, in the technique described in Patent Document 1, a user cannot know where the image, projected while avoiding the obstacle, is planned to be displayed on the table if the obstacle is not present.

Means of Solving the Problems

To solve the above problem, an information processing apparatus according to a preferred mode of the present invention is an information processing apparatus for use in a projection system including a projection apparatus, which is configured to project a first image including an individual image toward a projection region, and an image capturing apparatus, which is configured to generate captured image information by capturing the projection region, the individual image indicating information regarding an object existing in the projection region, the information processing apparatus including an acquirer configured to acquire the captured image information, a recognizer configured to recognize, based on the captured image information, an obstacle existing between the projection region and the projection apparatus, an identifier configured to, in response to the recognizer recognizing the obstacle, determine, based on first image information indicative of the first image and a result of recognition by the recognizer, whether projection of the individual image toward the project region is blocked by the obstacle, and to identify the individual image as a specific image in response to a result of the determination being affirmative, a decider configured to decide changing a first projection position in the projection region, on which the specific image is projected, to a second projection position in the projection region toward which projection of the specific image is not blocked by the obstacle, a generator configured to generate, based on the first image information, second image information indicative of a second image including the specific image located at the second projection position and an auxiliary image that teaches association between the specific image and the object, and an outputter configured to output the second image information to the projection apparatus.

Effect of the Invention

According to the present invention, when a specific image is displayed on a changed projection position, a user can recognize that the specific image and an object are associated with each other by an auxiliary image that teaches the association between the specific image and the object.

MODES FOR CARRYING OUT THE INVENTION

1. Embodiment

The following is a description of a projection system 1 according to an embodiment.

1.1 Summary of Projection System 1

Figure 1:
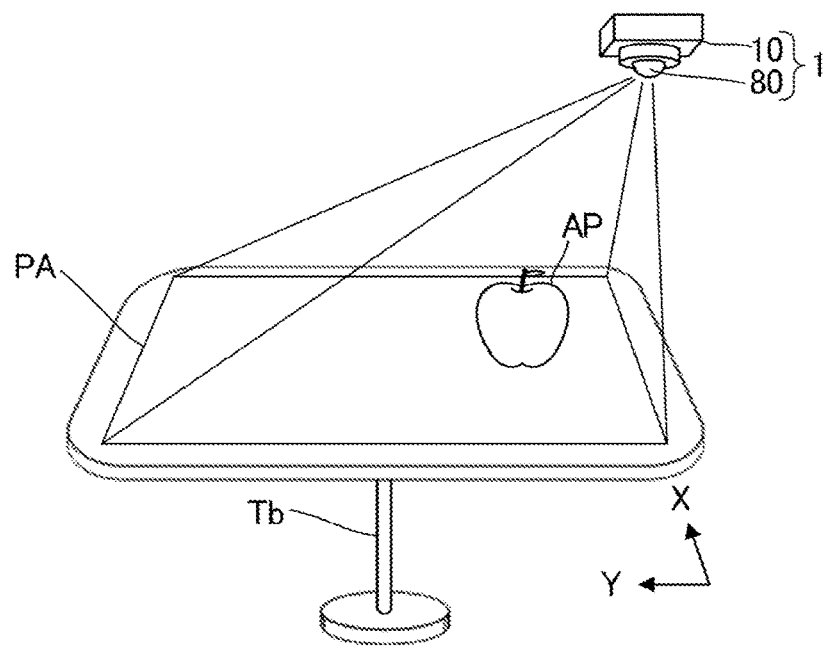
FIG. 1 is a diagram illustrating an overview of a projection system 1.

FIG. 1 is a diagram illustrating an overview of a projection system 1. The projection system 1 projects an image on a projection region PA. The form of the projection region PA may be a flat surface or a curved surface. In FIG. 1, the projection region PA is a region within an upper surface of a top board of a table Tb. However, the projection region PA is not limited to the region within the upper surface of the top board of the table Tb, and it may be, for example, a region on a projection screen or a region within a wall of a building, etc.

An apple AP, which is an example of an object, exists in the projection region PA on the table Tb. The projection system 1 projects an additional image indicative of additional information regarding the object. The additional information is, for example, a description of the object. If the object is a book written in English, the additional information is, for example, Japanese text translated from the English text written in the book. If the object is cooked food, the additional information is, for example, the number indicative of the calories in the cooked food.

The projection system 1 includes an information processing apparatus 10 and a projection apparatus 80. The information processing apparatus 10 is a computer used in the projection system 1. In FIG. 1, the information processing apparatus 10 is attached to a ceiling of a room in which the table Tb is provided. The projection apparatus 80 is attached to the information processing apparatus 10.

In the following description, an X-axis and a Y-axis are defined on the projection region PA. The X-axis and the Y-axis are perpendicular to each other. The direction of the arrow of the X-axis in FIG. 1 is referred to as a "+X direction," and a direction opposite to the +X direction is referred to as a "−X direction." Furthermore, the direction of the arrow of the Y-axis in FIG. 1 is referred to as a "+Y direction," and a direction opposite to the +Y direction is referred to as a "−Y direction." As shown in FIG. 1, the projection apparatus 80 is provided above the table Tb.

Figure 2:
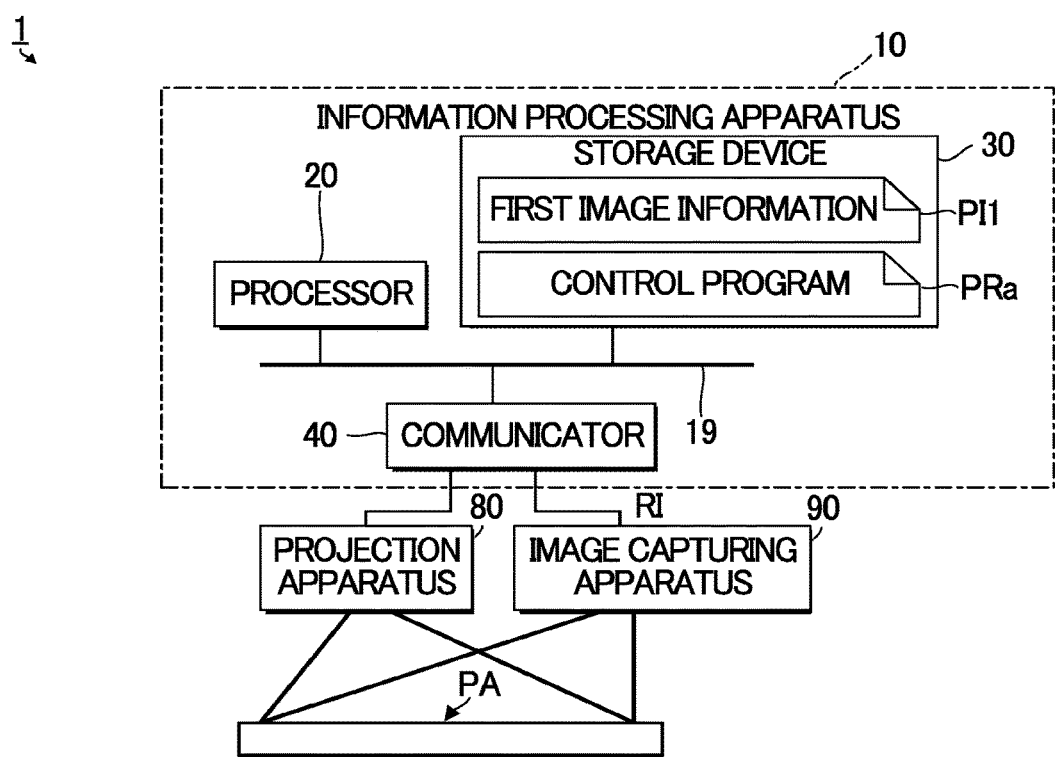
FIG. 2 is a block diagram illustrating a hardware configuration of the projection system 1.

FIG. 2 is a block diagram illustrating a hardware configuration of the projection system 1. The projection system 1 includes an image capturing apparatus 90 in addition to the information processing apparatus 10 and the projection apparatus 80 that are shown in FIG. 1

The projection apparatus 80 projects an image on the projection region PA under the control of the information processing apparatus 10.

Figure 3:
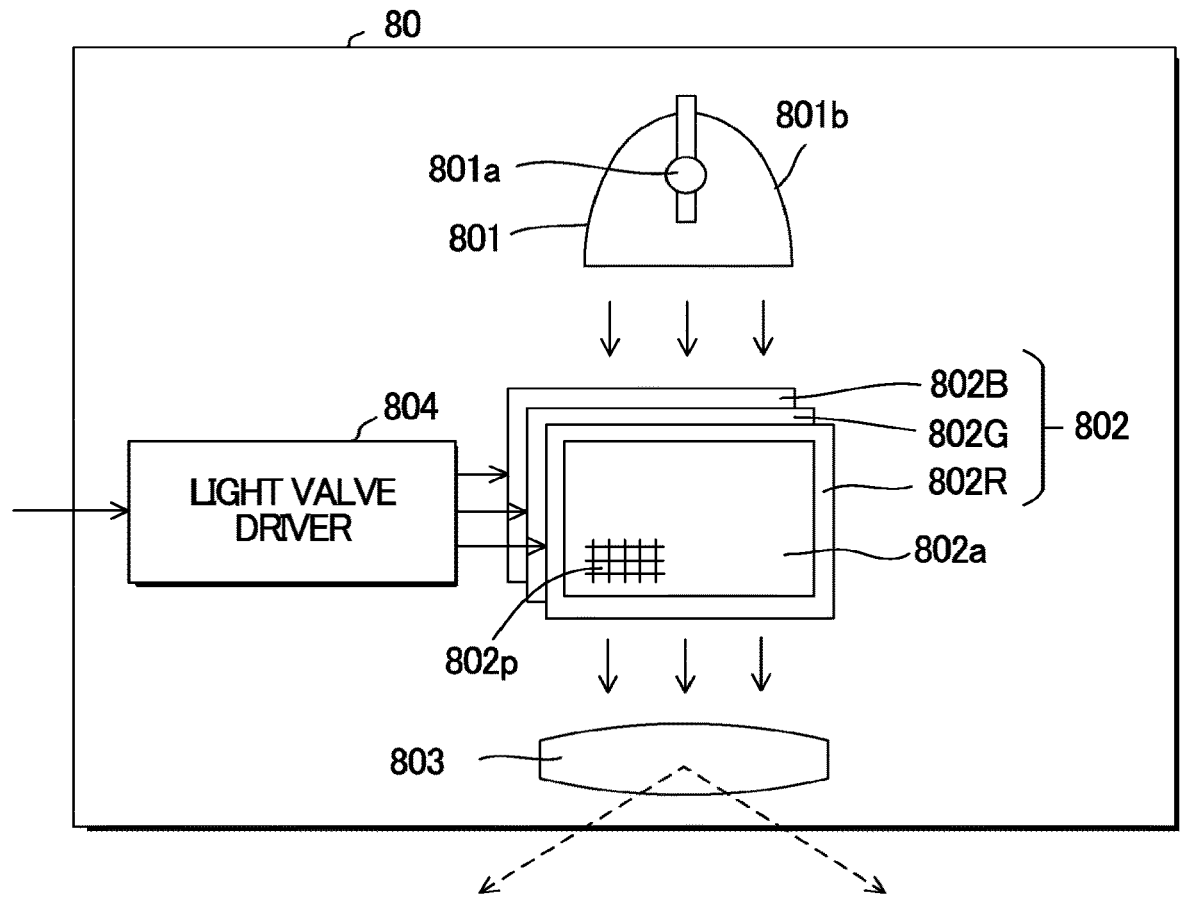
FIG. 3 is a diagram illustrating an example of a projection apparatus 80.

FIG. 3 is a diagram illustrating an example of the projection apparatus 80. The projection apparatus 80 includes a light source 801, three liquid crystal light valves 802R, 802G, and 802B that are examples of light modulating devices, a projection lens 803 that is an example of a projection optical system, and a light valve driver 804, etc. The projection apparatus 80 modulates a light emitted from the light source 801 with the liquid crystal light valve 802. When the modulated light is magnified and projected through the projection lens 803, an image is projected on the projection region PA.

The light source 801 includes a light emitter 801a, which is a xenon lamp, a super high-pressure mercury lamp, a light emitting diode (LED), or a laser light source, etc., and a reflector 801b that reduces variation in direction of the light emitted from the light emitter 801a. Variation in brightness distribution in the light emitted from the light source 801 is reduced by an integrator optical system (not shown). Then, the light is separated into red, green, and blue light components, which are three primary colors of light, by a color separation optical system (not shown). The red, green, and blue light components are incident on the liquid crystal light valves 802R, 802G, and 802B, respectively.

The liquid crystal light valve 802 includes a liquid crystal panel, in which liquid crystal is sealed between a pair of transparent substrates, etc. The liquid crystal light valve 802 includes a rectangular pixel region 802a consisting of a plurality of pixels 802p arranged in a matrix. In the liquid crystal light valve 802, it is possible to apply a drive voltage to the liquid crystal for each pixel 802p. The light valve driver 804 applies the drive voltage, which corresponds to image data indicative of an image to be projected on the projection region PA, to each pixel 802p. In response to the drive voltage being applied to the liquid crystal of each pixel 802p, each pixel 802p is set to light transmittance corresponding to image information. Therefore, the light emitted from the light source 801 is modulated by passing through the pixel region 802a. An image is projected on the projection region PA by each color of light being projected on the projection region PA.

Description will now be given, returning to FIG. 2. The image capturing apparatus 90 generates captured image information RI by photographically capturing the projection region PA. The image capturing apparatus 90 may capture only the projection region PA, or it may capture the projection region PA and a region around the projection region PA. In the following, an image capturing apparatus 90 will be described that captures the projection region PA and the region around the projection region PA. The image capturing apparatus 90 includes, for example, an imaging optical system and an image sensor. The imaging optical system is an optical system including at least one taking lens. The imaging optical system may include various optical elements such as a prism, or it may include a zoom lens, a focus lens, etc. The image sensor may include, for example, a charge coupled device (CCD) image sensor or a complementary MOS (CMOS) image sensor, etc.

The information processing apparatus 10 includes a processor 20, a storage device 30, a communicator 40, and a bus 19. The processor 20, the storage device 30, and the communicator 40 are mutually accessed through the bus 19 for communicating information. The bus 19 may be a single bus, or it may include different buses used for different devices.

The processor 20 is a processor that controls the entire information processing apparatus 10, and includes a central processing unit (CPU) including an interface, an arithmetic device, and registers. Note that some or all of the functions of the processor 20 may be implemented by hardware, such as by a digital signal processor (DSP), an application specific integrated circuit (ASIC), a programmable logic device (PLD), and a field programmable gate array (FPGA), etc. The processor 20 executes various processes in parallel or sequentially.

The storage device 30 is a recording medium that is readable by the processor 20, and stores a plurality of programs including a control program PRa to be executed by the processor 20, various information to be used by the processor 20, and first image information PH. The storage device 30 includes, for example, one or more types of memory circuits, such as a read only memory (ROM), an erasable programmable ROM (EPROM), an electrically erasable programmable ROM (EEPROM), and a random access memory (RANI), etc. The first image information PH is information indicative of a first image P1.

Figure 4:
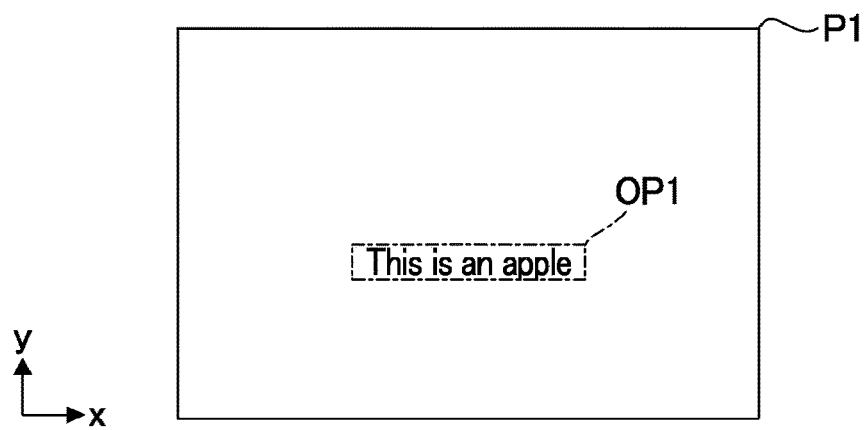
FIG. 4 is a diagram illustrating an example of a first image P1.

FIG. 4 is a diagram illustrating an example of the first image P1. FIG. 4 illustrates an image formed on the liquid crystal light valve 802 in a situation in which the first image P1 is displayed by the projection apparatus 80. In the following description, an x-axis and a y-axis are defined on the liquid crystal light valve 802 while being distinguished from the X-axis and the Y-axis on the projection region PA. The x-axis and the y-axis are perpendicular to each other. The direction of the arrow of the x-axis in FIG. 4 is referred to as a "+x direction," and a direction opposite to the +x direction is referred to as a "−x direction." Furthermore, the direction of the arrow of the y-axis in FIG. 4 is referred to as a "+y direction," and a direction opposite to the +y direction is referred to as a "−y direction."

When an arrow in the +y direction is projected on the projection region PA, an image formed on the liquid crystal light valve 802 is an arrow in the +y direction. In other words, the −y direction corresponds to the −Y direction, and the +y direction corresponds to the +Y direction. Similarly, the −x direction corresponds to the −X direction, and the +x direction corresponds to the +X direction.

The first image P1 includes one or more individual images. The individual image is, for example, an image in imitation of a real object, an image of an object that does not exist in reality, and an image indicative of text. The image of the object that does not exist in reality is, for example, an image indicative of a character from a comic book, etc. In FIG. 4, the first image P1 includes an individual image OP1. The individual image OP1 is the additional image described above, and it indicates information (additional information) regarding the apple AP that is the object. In FIG. 4, the individual image OP1 is English text describing the apple AP. Since the individual image OP1 indicates the information regarding the apple AP, the individual image OP1 is associated with a position of the apple AP. A position associated with the position of the apple AP existing in the projection region PA is referred to as a "target position." The target position is a position of the object, which in this embodiment is the position of the apple AP. However, the target position is not limited to the position of the object, and may be, for example, a position within a predetermined range from the object. In the following description, the target position is described as the position of the object. The position of the object may be any position within the object, but it is preferably close to a center of gravity of the object. The center of gravity is a point at which the sum of the cross-sectional primary moments of a target shape in plan view is zero.

In an example of generating the first image information PI1, the processor 20 analyzes an image, which is obtained by the image capturing apparatus 90 capturing the projection region PA, to identify that this image includes an image of the apple AP. Then, the processor 20 generates the first image information PI1, which indicates the first image P1 including the individual image OP1 indicative of "This is an apple," as the additional information regarding the apple AP.

The individual image OP1 in this example indicates a virtual object. When the individual image OP1 is displayed on a real object, such as on the top board of table Tb or the apple AP, augmented reality is realized.

Description will now be given returning to FIG. 2. The communicator 40 is a device that communicates with other devices, and the communicator 40 is referred to as a network device, a network controller, a network card, or a communication module, for example. The communicator 40 is capable of communicating with the projection apparatus 80 and the image capturing apparatus 90.

Figure 5:
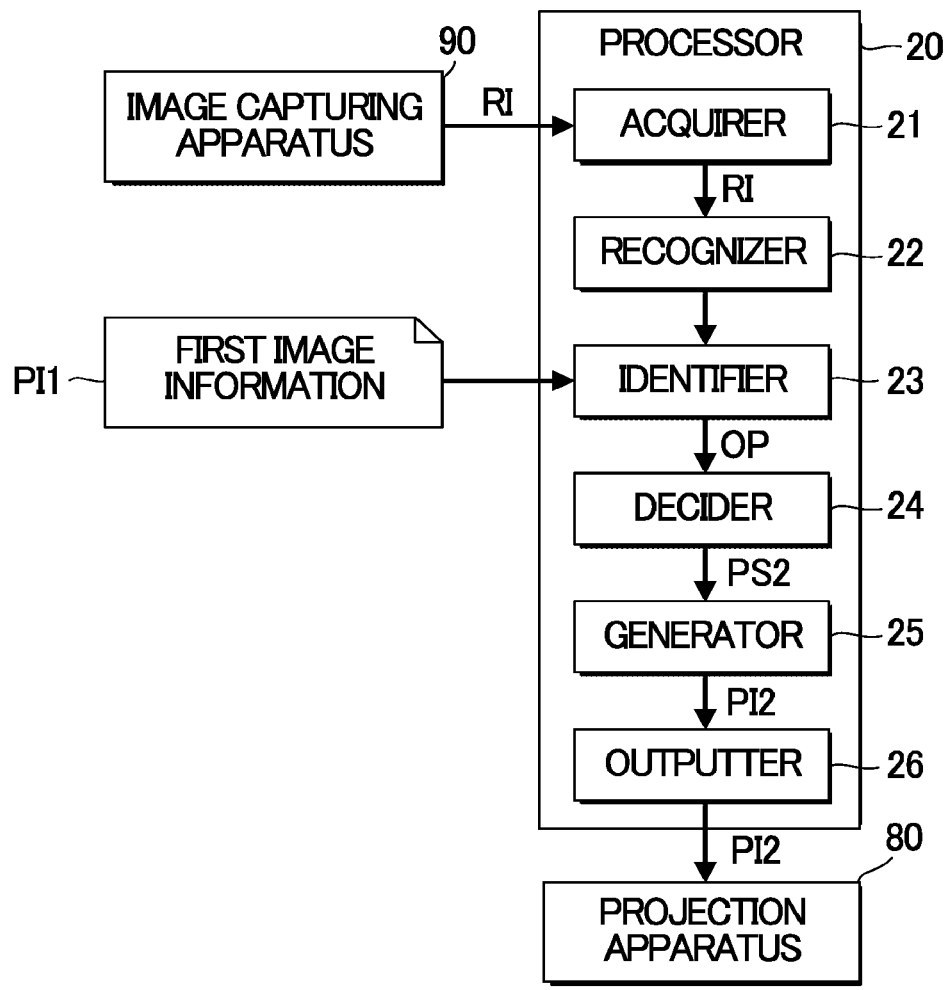
FIG. 5 is a block diagram illustrating functions of the projection system 1.

FIG. 5 is a block diagram illustrating functions of the projection system 1. The processor 20 reads the control program PRa from the storage device 30, and functions as an acquirer 21, a recognizer 22, an identifier 23, a decider 24, a generator 25, and an outputter 26 by executing the control program PRa.

The acquirer 21 acquires the captured image information RI from the image capturing apparatus 90. A captured image RP indicated by the captured image information RI is, for example, one of two modes described below. The captured image RP in a first mode is an image obtained by the image capturing apparatus 90 capturing the projection region PA in a case in which the projection apparatus 80 projects the first image P1 indicated by the first image information PH on the projection region PA. The captured image RP in a second mode is an image obtained by the image capturing apparatus 90 capturing the projection region PA in a case in which the projection apparatus 80 is not projecting any images.

The recognizer 22 recognizes, based on the captured image information RI, an object existing between the projection region PA and the projection apparatus 80. The object existing between the projection region PA and the projection apparatus 80 is hereinafter referred to as an "obstacle."

Figure 6:
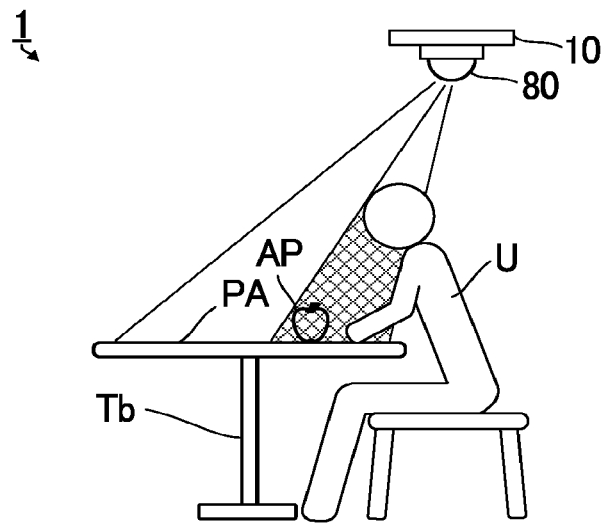
FIG. 6 is a diagram illustrating an example of an obstacle.

FIG. 6 is a diagram illustrating an example of the obstacle. In FIG. 6, a part of a user U, which is an example of the obstacle, exists between the projection region PA and the projection apparatus 80. When the obstacle exists, a part of the first image P1 may not be projected on the projection region PA. As described above, the individual image OP1, which is the additional image regarding the apple AP, should be placed in a vicinity of the apple AP. In FIG. 6, since the apple AP is hidden by the obstacle, probability increases that the individual image OP1 is not projected on the projection region PA.

In an example of recognizing the obstacle, the recognizer 22 compares the captured image RP indicated by the captured image information RI with a reference image to recognize presence of the obstacle and a region on the projection region PA corresponding to the obstacle when a difference between the captured image RP and the reference image is present. When the captured image RP is in the first mode, the reference image is an image obtained by the image capturing apparatus 90 capturing the projection region PA in a situation in which it is identified that no obstacle is present and in a situation in which the projection apparatus 80 projects the first image P1 on the projection region PA. When the captured image RP is in the second mode, the reference image is an image obtained by the image capturing apparatus 90 capturing the projection region PA in a situation in which it is identified that no obstacle is present and in a situation in which the projection apparatus 80 is not projecting any image. For example, the information processing apparatus 10 generates information indicative of the reference image at a time of initial setting of the projection system 1 to store the information indicative of the reference image in the storage device 30. In the following, the captured image RP in the first mode will be described.

Figure 7:
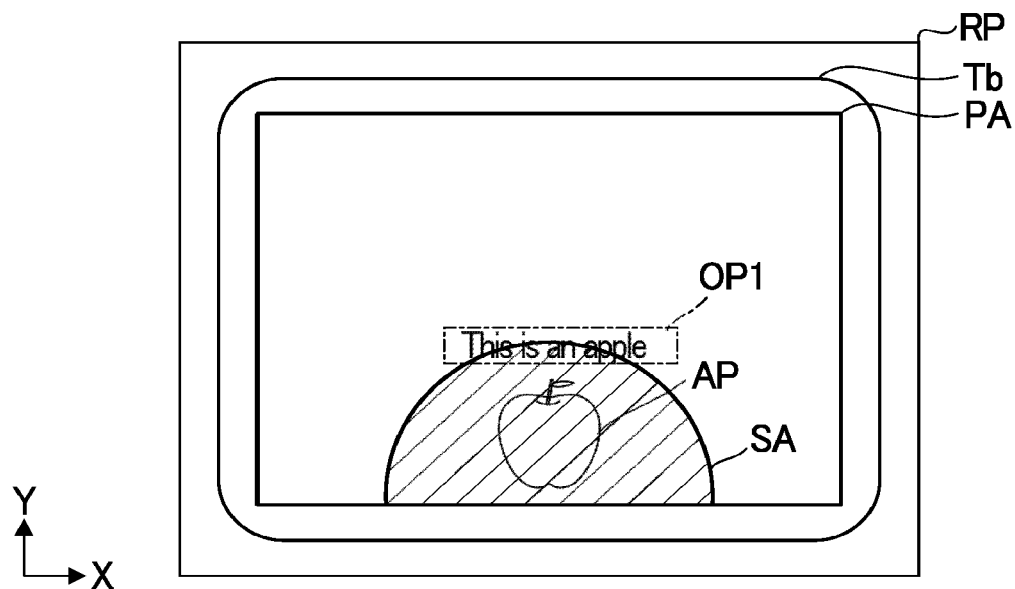
FIG. 7 is a diagram illustrating an example of a captured image RP.

FIG. 7 is a diagram illustrating an example of the captured image RP. The captured image RP in FIG. 7 is an image obtained by the image capturing apparatus 90 that, in a situation shown in FIG. 6, captures the projection region PA. In FIG. 7, there is a shaded region SA in a lower part of the captured image RP. The shaded region SA is a region on the projection region PA toward which the light projected from the projection apparatus 80 is blocked by the user U, which is an example of an obstacle. The recognizer 22 outputs information indicative of the shaded region SA as a recognition result. The information indicative of the shaded region SA is, for example, information indicative of an outline of the shaded region SA.

Description will now be given, returning to FIG. 5. In response to the recognizer 22 recognizing an obstacle, the identifier 23 identifies, based on the first image information PH indicative of the first image P1 that is be projected toward the projection region PA and the recognition result of the recognizer 22, an individual image, which is blocked by the obstacle, in the first image P1 as a specific image. The identified individual image is not projected on the projection region PA because it is blocked by the obstacle. In other words, the specific image is an individual image of which projection toward the projection region PA is blocked by the obstacle. For example, if projection of one individual image among one or more individual images included in the first image P1 toward the projection region PA is blocked by the obstacle, the one individual image is the specific image. The identifier 23 identifies, as the specific image, an individual image overlapping the shaded region SA indicated by the recognition result of the recognizer 22. The identifier 23 may identify, as the specific image, an individual image that entirely overlaps the shaded region SA, or may identify, as the specific image, an individual image that partially overlaps the shaded region SA. In the following, the identifier 23 identifies, as the specific image, the individual image that partially overlaps the shaded region SA. In FIG. 7, the identifier 23 identifies, as the specific image, the individual image OP1 that partially overlaps the shaded region SA. The identifier 23 outputs information indicative of a region in the projection region PA on which the individual image OP1 is projected. For example, if the region on which the individual image OP1 is projected has a rectangular shape, the information indicative of the region on which the individual image OP1 is projected is the coordinates of each vertex of the region having a rectangular shape.

When the projection of the individual image OP1 is blocked by an obstacle, the information processing apparatus 10 changes a position to be changed PS1 (an example of a "first projection position") to a changed position PS2 (an example of a "second projection position"). The position to be changed SP1 is a position of the specific image in the projection region PA on which the specific image is projected in a situation in which no obstacle is present. The changed position SP2 is a position of the specific image in the projection region PA on which the specific image is projected in a situation in which an obstacle is present. The position of the specific image in the situation in which an obstacle is present is a position on which the projection of the specific image toward the projection region PA is not blocked by the obstacle. The decider 24 decides to change the position to be changed PS1 of the specific image to the changed position PS2. The position, on which projection of the specific image toward the projection region PA is not blocked by an obstacle, may be a position on which all of the specific image is not blocked by the obstacle, or it may be a position on which a part of the specific image is not blocked by the obstacle. If the position on which the part of the specific image is not blocked by the obstacle is used, an area of the part of the specific image not blocked by the obstacle is greater than an area of a part in which the specific image overlaps the shaded region SA. The changed position PS2 is preferably close to the position to be changed PS1 on which the specific image is positioned in the projection region PA in a situation in which no obstacle is present, and all of the specific image is preferably not blocked by an obstacle.

Figure 8:
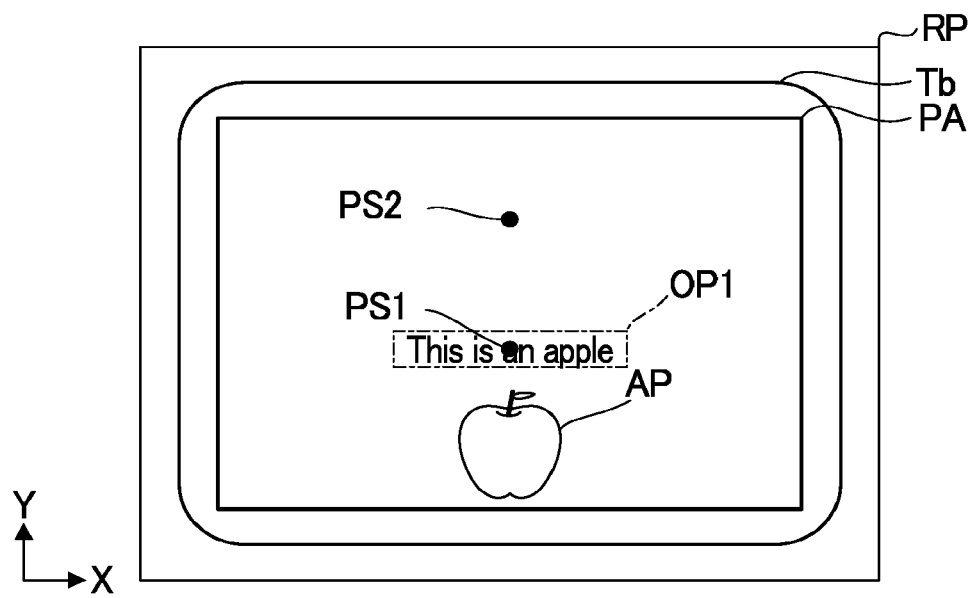
FIG. 8 is a diagram illustrating an example of a changed position PS2.

FIG. 8 is a diagram illustrating an example of the changed position PS2. FIG. 8 illustrates the projection region PA on which the first image P1 is projected in a situation in which no obstacle is present. FIG. 8 illustrates an example of the decider 24 that decides, as the changed position PS2, a position apart from the position to be changed PS1 in the +Y direction. The decider 24 outputs a coordinate corresponding to the changed position PS2 in the first image P1 as the changed position PS2.

Description will now be given, returning to FIG. 5. The generator 25 generates second image information PI2 based on the first image information PH. The second image information PI2 indicates a second image P2. The second image P2 includes the individual image OP1, which is a specific image located at a changed position PS2, and an auxiliary image HP. The auxiliary image HP teaches the target position associated with the individual image OP1 in a situation in which no obstacle is present (see FIG. 10). As described above, the target position is the position of the object, which is, in this embodiment, the position the apple AP. The target position is, for example, a position of an intersection point IP in FIG. 10. In other words, the auxiliary image HP teaches the apple AP, which is an example of the object corresponding to the specific image. In the first embodiment, a shape of the auxiliary image HP is an isosceles trapezoid, which is a type of quadrilateral.

Furthermore, the auxiliary image HP is associated with the individual image OP1. The two images are associated with each other by a distance between the auxiliary image HP and the individual image OP1. The generator 25 sets a position of the auxiliary image HP and a position of the individual image OP1 such that the distance between the auxiliary image HP and the individual image OP1 is less than or equal to a predetermined distance. A plurality of individual images including the individual image OP1 may be included in the second image P2. In this case, the generator 25 may set the position of the auxiliary image HP such that a distance between the individual image OP1 associated with the auxiliary image HP and the auxiliary image HP is the smallest among distances between each of the plurality of individual images and the auxiliary image HP.

Figure 9:
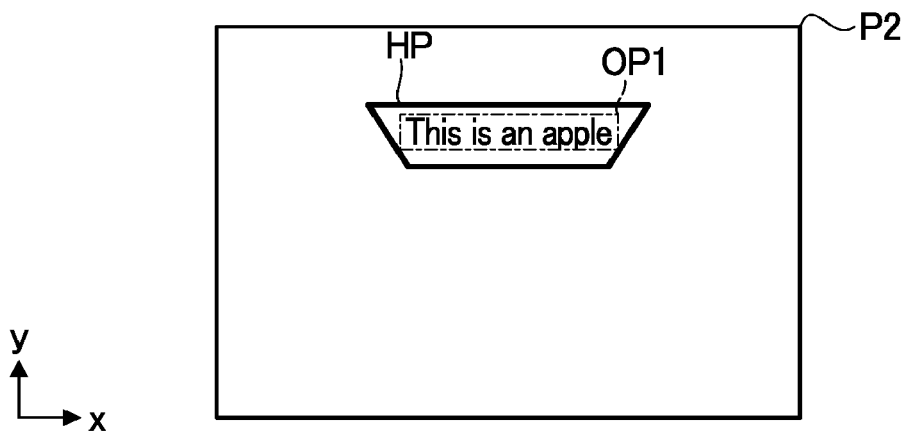
FIG. 9 is a diagram illustrating an example of a second image P2.

FIG. 9 is a diagram illustrating an example of the second image P2. The second image P2 in FIG. 9 is an image in which the auxiliary image HP is associated with the individual image OP1 located at the changed position PS2. In FIG. 9, the individual image OP1 is positioned inside the auxiliary image HP, and therefore, the auxiliary image HP is associated with the individual image OP1. In FIG. 9, the individual image OP1, which is changed, is located at a position apart from a position of the individual image OP1 to be changed in the +Y direction.

Description will now be given, returning to FIG. 5. The outputter 26 outputs the second image information PI2 to the projection apparatus 80.

Figure 10:
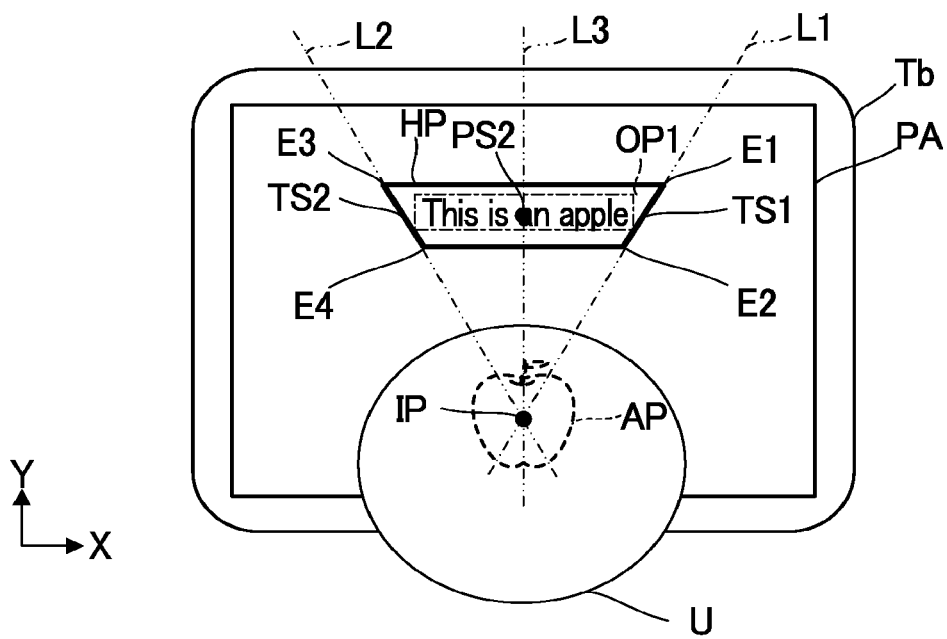
FIG. 10 is a diagram illustrating a projection region PA on which the second image P2 is projected.

FIG. 10 is a diagram illustrating the projection region PA on which the second image P2 is projected. FIG. 10 is a plan view when viewed from a direction from the projection apparatus 80 toward the projection region PA. Projecting the second image P2 prevents the individual image OP1, of which position is changed, from being blocked by the user U. The auxiliary image HP, which is an isosceles trapezoid, includes a first side TS1 and a second side TS2. The first side TS1 and the second side TS2 are legs of the isosceles trapezoid. The first side TS1 is an example of a "first line segment." The second side TS2 is an example of a "second line segment." In plan view as described above, the intersection point IP of a straight line L1 including the first side TS1 with a straight line L2 including the second side TS2 overlaps the apple AP. In FIG. 10, the apple AP, which is blocked by the user U, is illustrated in dashed line. The intersection point IP preferably overlaps the apple AP in plan view as described above, and furthermore, it is preferable that the intersection point IP be as close as possible to the center of gravity of the apple AP. The straight line L1 and the straight line L2 are virtual straight lines and are not displayed in the projection region PA.

1.2 Operation of Projection System 1

Operation of the projection system 1 will be described with reference to FIG. 11.

Figure 11:
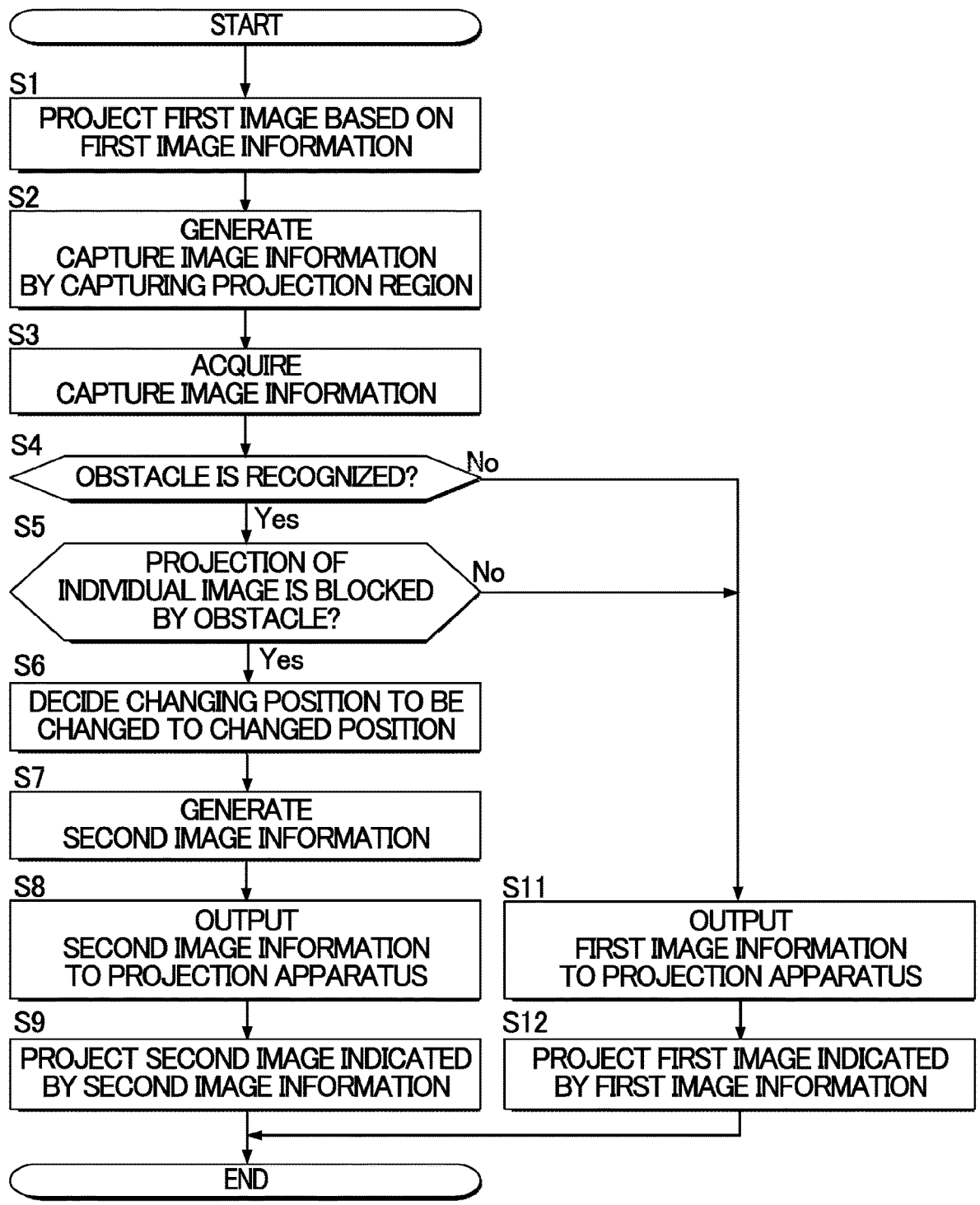
FIG. 11 is a flowchart illustrating an operation of the projection system 1.

FIG. 11 is a flowchart illustrating the operation of the projection system 1. The projection apparatus 80 projects the first image P1 indicated by the first image information PI1 (step S1). The image capturing apparatus 90 generates the captured image information RI by capturing the projection region PA (step S2). Then, the processor 20 of the information processing apparatus 10, by functioning as the acquirer 21, acquires the captured image information RI from the image capturing apparatus 90 (step S3). Then, the processor 20, by functioning as the recognizer 22, determines whether an obstacle is recognized based on the captured image information RI (step S4).

In response to the processor 20 recognizing an obstacle (step S4: Yes), the processor 20, by functioning as the identifier 23, determines whether the projection of the individual image toward the projection region PA is blocked by the obstacle in a situation in which the projection apparatus 80 displays the first image P1 (step S5). When a result of the determination is affirmative (step S5: Yes), the identifier 23 identifies the individual image as the specific image. The processor 20, by functioning as the decider 24, decides changing the position to be changed PS1 of the specified image to the changed position PS2 (step S6).

The processor 20, by functioning as the generator 25, generates the second image information PI2 indicative of the second image P2 in which the auxiliary image HP is associated with the individual image located at the changed position PS2 (step S7). The processor 20, by functioning as the outputter 26, outputs the second image information PI2 to the projection apparatus 80 (step S8). The projection apparatus 80 projects the second image P2 indicated by the second image information PI2 on the projection region PA (step S9). After completion of the processing in step S9, the projection system 1 ends a series of processing operations shown in FIG. 11.

When the processor 20 does not recognize any obstacle (step S4: No), or when it determined that the projection of the individual image toward the projection region PA is not blocked by an obstacle (step S5: No), the processor 20, by functioning as the outputter 26, outputs the first image information PI1 to the projection apparatus 80 (step S11). The projection apparatus 80 projects the first image P1 indicated by the first image information PI1 on the projection region PA (step S12). After completion of the processing of step S12, the projection system 1 ends the series of processing operations shown in FIG. 11.

According to the above description, the information processing apparatus 10 generates the second image information PI2 indicative of the second image P2 to output the second image information PI2 to the projection apparatus 80. The second image P2 is an image including the auxiliary image HP and the specific image located at the changed position PS2. The changed position PS2 is a position on which the specific image is not blocked by an obstacle. Therefore, the user U can see the specific image located at the changed position PS2. Furthermore, the auxiliary image HP teaches the association between the specific image and the apple AP. When the user U sees the auxiliary image HP, the user U can easily identify the position of the apple AP, which is an original position with which the specific image should have been associated.

Furthermore, the auxiliary image HP is associated with the individual image. Therefore, the user U can easily identify the individual image associated with the auxiliary image HP when the second image P2 includes a plurality of individual images. Furthermore, the user U can easily identify the position of the apple AP that is the target position taught by the auxiliary image HP associated with the individual image.

The auxiliary image HP is a quadrilateral with the first side TS1 and the second side TS2. In plan view, when viewed from the direction from the projection apparatus 80 toward the projection region PA, the intersection point IP of the straight line L1 including the first side TS1 with the straight line L2 including the second side TS2 in the projection region PA overlaps the apple AP in a situation in which the second image P2 is projected by the projection apparatus 80. The auxiliary image HP can guide the user U's gaze to the position of the apple AP by the straight line L1 and the straight line L2. With the guidance by the auxiliary image HP, the user U can easily identify the original position of the apple AP with which the specific image should have been associated.

The specific image included in the second image P2 is positioned between the first side TS1 and the second side TS2. The specific image positioned between the first side TS1 and the second side TS2 means the specific image positioned within a quadrilateral having, as vertexes, two end points of the first side TS1 and two end points of the second side TS2. In FIG. 10, the first side TS1 includes a first end point E1 and a second end point E2. The second side TS2 includes a third end point E3 and a fourth end point E4. In FIG. 10, the individual image OP1, which corresponds to the specific image, is positioned within the quadrilateral having, as the vertexes, the first end point E1, the second end point E2, the third end point E3, and the fourth end point E4. In the first embodiment, the quadrilateral having, as the vertexes, the first end point E1, the second end point E2, the third end point E3, and the fourth end point E4 corresponds to the auxiliary image HP. The individual image OP1 positioned between the first side TS1 and the second side TS2 allows the user U to easily identify the auxiliary image HP associated with the individual image OP1.

Also, when the first side TS1 and the second side TS2 are interpreted as two line segments, the two line segments are united in a single quadrilateral. Therefore, the auxiliary image HP allows the user U to easily understand both the first side TS1 and the second side TS2, which are united, constituting an image indicative of the position to be changed PS1.

Furthermore, the auxiliary image HP is an isosceles trapezoid. When the auxiliary image HP is the isosceles trapezoid, as shown in FIG. 10, the apple AP is on the straight line L3 that passes through the center of gravity of the auxiliary image HP and that is perpendicular to both the upper side and the lower side of the isosceles trapezoid. Therefore, the auxiliary image HP can guide the user U's gaze to the apple AP by the straight line L1, the straight line L2, and the straight line L3. Compared to an auxiliary image HP that is not an isosceles trapezoid, the auxiliary image HP has more straight lines to guide the user U's gaze, and therefore, the user U can more easily identify the original position of the apple AP with which the individual image should have been associated.

Furthermore, the individual image indicates a virtual object. When a virtual object in augmented reality is displayed in its original position, the user U may easily understand the meaning of the display of the virtual object. As described above, the individual image is an additional image regarding the object and is located at a position associated with the object in a situation in which no obstacle is present. When the user U sees the auxiliary image HP teaching the position associated with the object, the user U can easily identify that the information indicated by the individual image is information regarding the object. In an example other than the apple AP, if a virtual object in imitation of a timer is projected on a region in a vicinity of an actual cup of instant noodles, the user U can easily understand that the timer is being projected to show the time that has passed since hot water was poured into the cup with the instant noodles. In this embodiment, since the auxiliary image HP teaches the position of the object with which the virtual object is associated, the user U can easily understand the meaning of the projection of the virtual object. Since the user U can easily understand the meaning of the projection of the virtual object, the projection system 1 can improve usability of augmented reality.

2. Modifications

Each of the above modes can be modified in various ways. Specific modifications will be explained below. Two or more modifications freely selected from the following modifications may be combined as long as no conflict arises from such combination. It should be noted that, in the modifications below, elements having the same effects or functions as those in the embodiment are given the aforementioned reference numerals, and detailed description thereof will be omitted as appropriate.

(1) In the embodiment, the auxiliary image HP is an isosceles trapezoid that is a kind of quadrilateral, but it is not limited to an isosceles trapezoid and may be any other kind of quadrilateral. For example, the auxiliary image HP may be a trapezoid that is not an isosceles trapezoid. Furthermore, the auxiliary image HP is not limited to a quadrilateral. For example, the auxiliary image HP may be a polygon with four or more sides including two sides that are a first line segment and a second line segment, and the individual image may be positioned within the polygon, and an intersection point of a straight line including the first line segment with a straight line including the second line segment may overlap the object. For example, the auxiliary image HP may be a pentagon, and two sides of the pentagon may correspond to the first line segment and the second line segment. The auxiliary image HP may not be made up of line segments like a quadrilateral, and may include a curved line. For example, the auxiliary image HP may be a diagram obtained by replacing one or all of an upper side and a lower side of a trapezoid with curved lines. The auxiliary image HP is not limited to a diagram that forms a closed area, such as a quadrilateral. For example, the auxiliary image HP may consist of only a first line segment LS1 and a second line segment LS2 as shown in FIG. 12.

Figure 12:
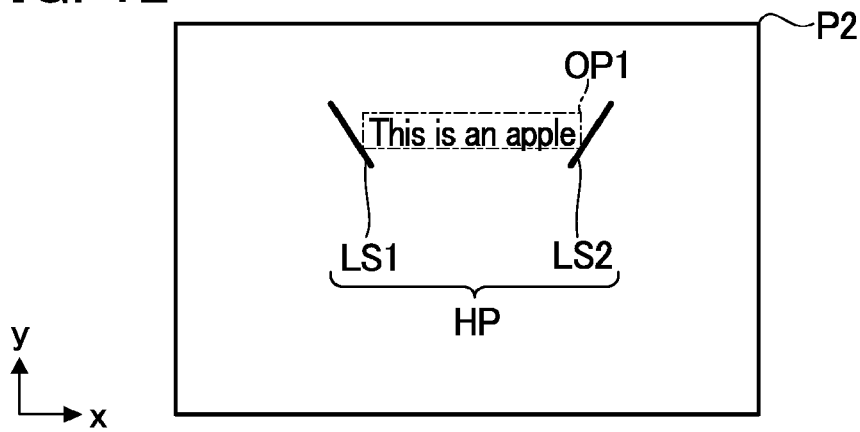
FIG. 12 is a diagram illustrating an example of an auxiliary image HP in a first modification.

FIG. 12 is a diagram illustrating an example of the auxiliary image HP in a first modification. The auxiliary image HP in FIG. 12 consists of the first line segment LS1 and the second line segment LS2. In FIG. 12, the auxiliary image HP is a diagram obtained by omitting an upper side and a lower side from an isosceles trapezoid. In FIG. 12, the auxiliary image HP is associated with the individual image OP1 by the individual image OP1 positioned between the first line segment LS1 and the second line segment LS2. In FIG. 12, the length of the first line segment LS1 and the length of the second line segment LS2 are identical to each other, but they may be different from each other.

(2) In the first modification, the specific image is positioned between the first line segment LS1 and the second line segment LS2, but it need not be positioned between the first line segment LS1 and the second line segment LS2.

Figure 13:
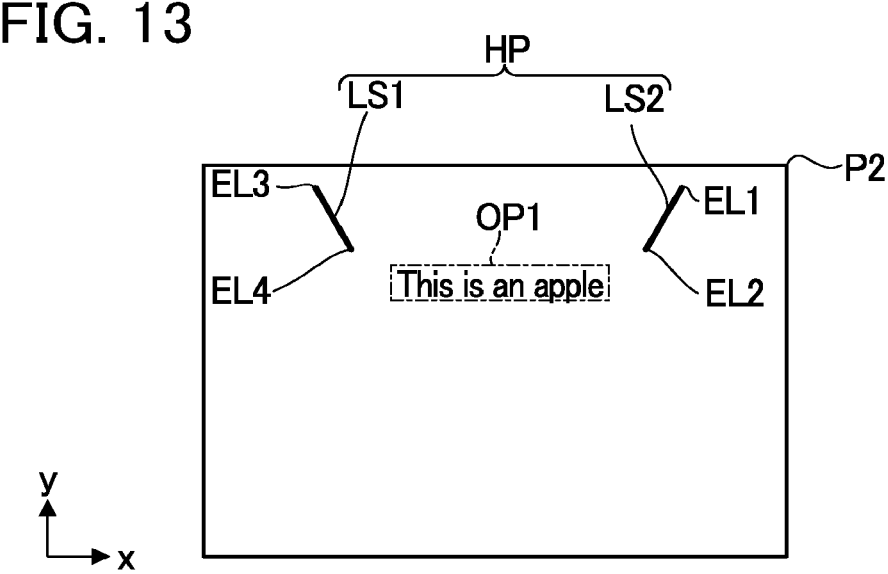
FIG. 13 is a diagram illustrating an example of the auxiliary image HP in a second modification.

FIG. 13 is a diagram illustrating an example of the auxiliary image HP in a second modification. The auxiliary image HP in FIG. 13 consists of the first line segment LS1 and the second line segment LS2. In FIG. 13, the individual image OP1 is not positioned between the first line segment LS1 and the second line segment LS2. In other words, the individual image OP1, which is the specific image, is not positioned within a quadrilateral that has, as vertexes, a first end point EL1 and a second end point EL2 of the first line segment LS1 and a third end point EL3 and a fourth end point EL4 of the second line segment LS2.

(3) In the first modification and the second modification, it is described that the auxiliary image HP may include the first line segment LS1 and the second line segment LS2, and that it may include a configuration in which the intersection point IP overlaps the apple AP in plan view when viewed from the direction from the projection apparatus 80 to the projection region PA, but the auxiliary image HP is not limited to the configuration described above. For example, in a third modification, the auxiliary image HP may include a line segment, which indicates a direction from the changed position PS2 toward the target position, and text regarding a distance (length) from the changed position PS2 to the target position. Hereinafter, the line segment, which indicates the direction from the changed position PS2 toward the target position, is simply referred to as "line segment indicative of the direction," and the text regarding the distance from the changed position PS2 to the target position is simply referred to as "text regarding the distance."

The text regarding the distance is, for example, one of two modes described below. The text regarding the distance in a first mode is text indicative of the distance from the changed position PS2 to the target position on the projection region PA with a unit of length such as centimeters or inches, etc.

Figure 14:
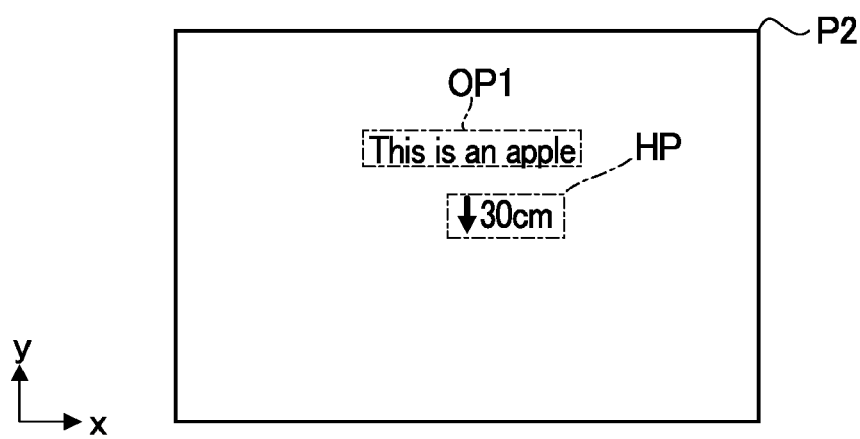
FIG. 14 is a diagram illustrating an example of text regarding a distance in a first mode.

FIG. 14 is a diagram illustrating an example of text regarding the distance in the first mode. In the example of FIG. 14, the auxiliary image HP included in the second image P2 includes an arrow indicative of the −y direction as the line segment indicative of the direction, and "30 cm" as the text regarding the distance in the first mode. To determine a value of the distance from the changed position PS2 to the target position on the projection region PA, it is necessary to determine a degree of magnification of an image projected on the projection region PA to an image on the liquid crystal light valve 802. To determine the degree of magnification of the image projected on the projection region PA, it is necessary to determine a distance from the projection apparatus 80 to the projection region PA. The distance from the projection apparatus 80 to the projection region PA may be determined, for example, by triangulation based on a triangle having the projection apparatus 80, the projection region PA, and the image capturing apparatus 90 as vertexes.

The text regarding the distance in a second mode is text indicative of how many times the distance from the changed position PS2 to the target position on the projection region PA is as long as a length of a line segment indicative of the direction.

Figure 15:
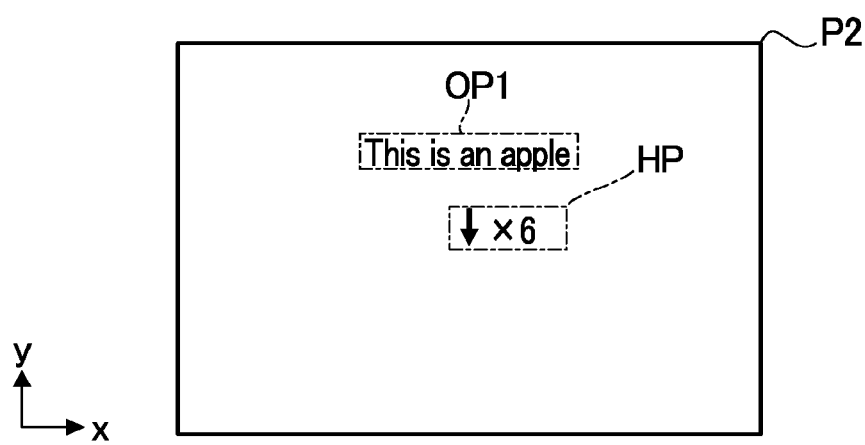
FIG. 15 is a diagram illustrating an example of the text regarding a distance in a second mode.

FIG. 15 is a diagram illustrating an example of text regarding the distance in the second mode. In FIG. 15, the auxiliary image HP included in the second image P2 includes an arrow indicative of the −y direction as the line segment indicative of the direction, and "x6" as text regarding the distance in the second mode. FIG. 15 indicates that the distance from the changed position PS2 to the target position on the projection region PA is six times as long as the length of the line segment indicative of the direction.

In the third modification, the mode in which the auxiliary image HP is associated with the specific image is one of the first mode and the second mode that are described above regarding the association. In the first mode or the second mode regarding the association, the distance between the auxiliary image HP and the specific image may be replaced with a distance between a starting point of the arrow, which is the line segment indicative of the direction in the auxiliary image HP, and the specific image.

According to the above description, even in the third modification, the user U can easily identify the original position of the apple AP with which the specific image should have been associated.

In comparison of the embodiment to the third modification, visibility is reduced in the third modification when a real object exists at a position on which the line segment indicative of the direction is displayed or when the projection region PA includes a pattern. Therefore, when the real object or the pattern exists, the embodiment can improve visibility compared to the third modification. Furthermore, even if the real object and the pattern are avoided, an area required to project the line segment indicative of the direction and the text regarding the distance is larger than an area required to project the auxiliary image HP in the embodiment. Therefore, compared to the auxiliary image HP in the third modification, the auxiliary image HP in the embodiment can reduce the area required for projection, and it is easily displayed while the real object and the pattern are avoided.

(4) In each mode described above, the auxiliary image HP is associated with the specific image, but it may not be associated with the specific image. For example, when the second image P2 has only one specific image, it is obvious that the auxiliary image HP is an image regarding this one specific image. Therefore, even if the auxiliary image HP is not associated with the specific image, the user U can more easily identify the original position of the apple AP with which the specific image should have been associated.

(5) In each mode described above, the acquirer 21 acquires the captured image information RI directly from the image capturing apparatus 90, but it is not limited to this. For example, when a relay device exists that is provided between the information processing apparatus 10 and the image capturing apparatus 90, the acquirer 21 may acquire the captured image information RI from the relay device described above.

(6) In each mode described above, the information processing apparatus 10 is attached to the ceiling, but it is not limited to this. For example, the information processing apparatus 10 may be attached to the upper surface of the top board of the table Tb. Alternatively, the information processing apparatus 10 may be installed outside the room in which the table Tb is provided. In a situation in which the information processing apparatus 10 is installed outside the room in which the table Tb is provided, the information processing apparatus 10 communicates with the projection apparatus 80 and the image capturing apparatus 90 via a network such as a mobile communication network or the Internet.

(7) In each mode described above, the information processing apparatus 10 is assumed to be a non-portable computer attached to the ceiling, but it is not limited to this, and it may be a portable terminal device such as a smartphone or a tablet terminal device.

Furthermore, in each mode described above, the auxiliary image HP is an image teaching the association between the specific image and the object, such as the apple AP, existing in the projection region PA, but the present disclosure is not limited to this. The auxiliary image HP may be an image teaching the position to be changed PS1 or an image indicative of the position to be changed PS1. For example, the position of the intersection point IP in FIG. 10 may be the position to be changed PS1. Furthermore, in the auxiliary image HP consisting of the first line segment LS1 and the second line segment LS2 in FIG. 12 and FIG. 13, the position of the intersection position of the straight line including the first line segment LS1 with the straight line including the second line segment LS2 may be the position to be changed PS1. In the auxiliary image HP in FIG. 14, the text regarding the distance indicates the distance from the changed position PS2 to the target position on the projection region PA, but the text regarding the distance may indicate a distance from the changed position PS2 to the position to be changed PS1. Furthermore, in the auxiliary image HP in FIG. 15, the text regarding the distance indicates how many times the distance from the changed position PS2 to the target position on the projection region PA is as long as a distance of the line segment indicative of the direction. The present disclosure is not limited this, and in the auxiliary image HP in FIG. 15, the text regarding the distance may indicate how many times the distance from the changed position PS2 to the position to be changed PS1 is as long as the distance of the line segment indicative of the direction.

(8) The block diagrams used for the description of each mode described above show functional unit blocks. These functional blocks (components) are implemented with freely selected hardware and/or software combination. There is no limitation on the means for implementing each functional block. In other words, each functional block may be implemented by one physically and/or logically combined device, or by two or more devices physically and/or logically separated and directly and/or indirectly connected (for example, by wire and/or wirelessly).

(9) The order of the processing procedures, sequences, flowcharts, and the like in each mode described above may be changed as long as no conflict occurs. For example, the method described in the specification presents various step elements in an exemplary order but is not limited to the presented specific order.

(10) In each mode described above, input and output information or the like may be stored in a specific location (for example, a memory) or a management table. The input and output information can be overwritten, updated, or written with additional information. The output information and the like may be deleted. The input information and the like may be transmitted to other devices.

(11) In each mode described above, the determination may be performed by a value (0 or 1) expressed as 1 bit, a Boolean value (true or false), or a comparison between numeric values (for example, a comparison with a predetermined value).

(12) In each mode described above, the storage device 30 is a recording medium readable by the processor 20, for which a ROM and a RANI were given as examples, but it may be a flexible disc, a magnetooptical disk (for example, a compact disc, a digital versatile disc, or a Blu-ray (registered trademark) disc), a smart card, a flash memory device (for example, a card, a stick, or a key drive), a compact disc-ROM (CD-ROM), a register, a removable disk, a hard disk, a floppy (registered trademark) disk, a magnetic strip, a database, a server, or other appropriate storage media. The program may be transmitted from a network. Alternatively, the program may be transmitted from a communication network via an electronic communication line.

(13) Each mode described above may be applicable to systems using Long Term Evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultrawideband (UWB), Bluetooth (registered trademark), and other appropriate systems, and/or next-generation systems extended based on the system.

(14) In each mode described above, the information, signals, and the like described above may be represented using any of a variety of different technologies. For example, data, instructions, commands, information, signals, bits, symbols, chips, and the like that may be mentioned throughout the above description may be represented by voltage, current, electromagnetic waves, magnetic fields or particles, optical fields or photons, or a freely selected combination thereof.

It should be noted that the terms described in this specification and/or terms necessary for understanding this specification may be replaced by terms having the same or similar meanings.

(15) Each function shown in FIG. 5 is implemented by any combination of hardware and software. Each function may be implemented by a single device, or may be implemented by two or more separate devices.

(16) The programs shown in each embodiment described above should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or other names.

Software, instructions, etc., may be transmitted and received via a transmission medium. For example, when the software is transmitted from a website, a server, or other remote sources using wired technology, such as a coaxial cable, fiber optic cable, twisted pair cable, or digital subscriber line (DSL), and/or wireless technology, such as infrared, wireless, or microwave technology, these wired and/or wireless technologies are included within the definition of the transmission medium.

(17) In each embodiment described above, information, parameters, and the like may be represented by absolute values, values relative to a predetermined value, or other corresponding information.

(18) The names used for the parameters described above are not limited in any way. Furthermore, the mathematical formulas and the like that use these parameters may differ from those explicitly disclosed herein.

(19) In each embodiment described above, the information processing apparatus 10 may be a mobile station. Those skilled in the art may refer to a mobile station as a subscriber station, mobile unit, subscriber unit, wireless unit, remote unit, mobile device, wireless device, wireless communicator, remote device, mobile subscriber station, access terminal, mobile terminal, wireless terminal, remote terminal, handset, user agent, mobile client, client, or other appropriate terms.

(20) In each embodiment described above, the phrase "based on" does not mean "based only on" unless otherwise explicitly stated. In other words, the phrase "based on" means both "based only on" and "based on at least."

(21) Any reference to an element using the designation "first", "second", or the like used herein does not generally limit the quantity or order of these elements. These designations may be used herein as a convenient way of distinguishing between two or more elements. Accordingly, references to the first and second elements do not mean that only two elements may be employed therein, or that the first element must precede the second element in any way.

(22) As long as the terms "including", "comprising", and variations thereof are used in each embodiment described above in the specification or in the claims, these terms are, like the term "comprising", intended to be inclusive. In addition, the term "or" used in the specification or in claims is not intended to be an exclusive OR.

(23) In the disclosure, for example, when articles such as "a", "an", and "the" in English are added in translation, these articles include plurals unless otherwise clearly indicated by the context.

(24) It is obvious to those skilled in the art that the present invention is not limited to the embodiments described in the specification. The present invention can be implemented in modified and altered modes without departing from the spirit and scope of the present invention defined in accordance with the claims. Therefore, the description of this specification is for illustrative purposes only and is not meant to be in any way limiting to the present invention. In addition, a plurality of modes selected from the modes shown the specification may be used in combination.

DESCRIPTION OF REFERENCE SIGNS

1 . . . projection system, 10 . . . information processing apparatus, 21 . . . acquirer, 22 . . . recognizer, 23 . . . identifier, 24 . . . decider, 25 . . . generator, 26 . . . outputter, 80 . . . projection apparatus, 90 . . . image capturing apparatus, HP . . . auxiliary image, LS1 . . . first line segment, LS2 . . . second line segment, OP1 . . . individual image, P1 . . . first image, P2 . . . second image, PA . . . projection region, PI1 . . . first image information, PI2 . . . second image information, PS1 . . . position to be changed, PS2 . . . changed position, RA . . . projection region, RI . . . captured image information, RP . . . captured image, SA . . . shaded region.

The invention claimed is:

1. An information processing apparatus for use in a projection system including a projection apparatus, which is configured to project a first image including an individual image toward a projection region, and an image capturing apparatus, which is configured to generate captured image information by capturing the projection region, the individual image indicating information regarding an object existing in the projection region, the information processing apparatus comprising:

an acquirer configured to acquire the captured image information;

a recognizer configured to recognize, based on the captured image information, an obstacle existing between the projection region and the projection apparatus;

an identifier configured to, in response to the recognizer recognizing the obstacle, determine, based on first image information indicative of the first image and a result of recognition by the recognizer, whether projection of the individual image toward the project region is blocked by the obstacle, and to identify the individual image as a specific image in response to a result of the determination being affirmative;

a decider configured to decide changing a first projection position in the projection region, on which the specific image is projected, to a second projection position in the projection region toward which projection of the specific image is not blocked by the obstacle;

a generator configured to generate, based on the first image information, second image information indicative of a second image including the specific image located at the second projection position and an auxiliary image that teaches association between the specific image and the object; and an outputter configured to output the second image information to the projection apparatus.

2. The information processing apparatus according to claim 1, wherein the auxiliary image is associated with the specific image.

3. The information processing apparatus according to claim 1,
wherein:
the auxiliary image includes a first line segment and a second line segment, and
in plan view from a direction from the projection apparatus toward the projection area, a point of intersection of a straight line, which includes the first line segment in the projection area in a situation in which the second image is projected by the projection apparatus, with a straight line including the second line segment, overlaps the object.

4. The information processing apparatus according to claim 3, wherein the specific image included in the second image is positioned between the first line segment and the second line segment.

5. The information processing apparatus according to claim 4,
wherein:
the auxiliary image is a polygon with four or more sides including two sides that are the first line segment and the second line segment, and
the specific image included in the second image is positioned inside the polygon.

6. The information processing apparatus according to claim 1, wherein the auxiliary image includes a line segment, which indicates a direction from the second projection position toward a target position associated with a position of the object, and text regarding a distance from the target position to the second projection position.

7. The information processing apparatus according to claim 1, wherein the individual image indicates a virtual object.

8. An information processing apparatus for use in a projection system including a projection apparatus, which is configured to project a first image including an individual image toward a projection region, and an image capturing apparatus, which is configured to generate captured image information by capturing the projection region, the information processing apparatus comprising:

an acquirer configured to acquire the captured image information;

a recognizer configured to recognize, based on the captured image information, an obstacle existing between the projection region and the projection apparatus;

an identifier configured to, in response to the recognizer recognizing the obstacle, determine, based on first image information indicative of the first image and a result of recognition by the recognizer, whether projection of the individual image toward the project region is blocked by the obstacle, and to identify the individual image as a specific image in response to a result of the determination being affirmative;

a decider configured to decide changing a first projection position in the projection region, on which the specific image is projected, to a second projection position in the projection region toward which projection of the specific image is not blocked by the obstacle;

a generator configured to generate, based on the first image information, second image information indicative of a second image including the specific image located at the second projection position and an auxiliary image that teaches the first projection position; and an outputter configured to output the second image information to the projection apparatus.

9. The information processing apparatus according to claim 8, wherein the auxiliary image includes a line segment, which indicates a direction from the second projection position toward the first projection position, and text regarding a distance from the first projection position to the second projection position.

10. A projection system including a projection apparatus, which is configured to project a first image including an individual image toward a projection region, an image capturing apparatus, which is configured to generate captured image information by capturing the projection region, and an information processing apparatus, the individual image indicating information regarding an object existing in the projection region, the projection system comprising:
an acquirer configured to acquire the captured image information;

a recognizer configured to recognize, based on the captured image information, an obstacle existing between the projection region and the projection apparatus;

an identifier configured to, in response to the recognizer recognizing the obstacle, determine, based on first image information indicative of the first image and a result of recognition by the recognizer, whether projection of the individual image toward the project region is blocked by the obstacle, and to identify the individual image as a specific image in response to a result of the determination being affirmative;

a decider configured to decide changing a first projection position in the projection region, on which the specific image is projected, to a second projection position in the projection region toward which projection of the specific image is not blocked by the obstacle;

a generator configured to generate, based on the first image information, second image information indicative of a second image including the specific image located at the second projection position and an auxiliary image that teaches association between the specific image and the object; and an outputter configured to output the second image information to the projection apparatus.

11. A projection system including a projection apparatus, which is configured to project a first image including an individual image toward a projection region, and an image capturing apparatus, which is configured to generate captured image information by capturing the projection region, wherein the information processing apparatus includes:
- an acquirer configured to acquire the captured image information,
- a recognizer configured to recognize, based on the captured image information, an obstacle existing between the projection region and the projection apparatus,
- an identifier configured to, in response to the recognizer recognizing the obstacle, determine, based on first image information indicative of the first image and a result of recognition by the recognizer, whether projection of the individual image toward the project region is blocked by the obstacle, and to identify the individual image as a specific image in response to a result of the determination being affirmative,
- a decider configured to decide changing a first projection position in the projection region, on which the specific image is projected, to a second projection position in the projection region toward which projection of the specific image is not blocked by the obstacle,
- a generator configured to generate, based on the first image information, second image information indicative of a second image including the specific image located at the second projection position and an auxiliary image that teaches the first projection position, and
- an outputter configured to output the second image information to the projection apparatus.

* * * * *

UNITED STATES PATENT AND TRADEMARK OFFICE
CERTIFICATE OF CORRECTION

PATENT NO. : 12,200,411 B2
APPLICATION NO. : 17/775489
DATED : January 14, 2025
INVENTOR(S) : Kensuke Ueda et al.

Page 1 of 1

It is certified that error appears in the above-identified patent and that said Letters Patent is hereby corrected as shown below:

In the Claims

In Claim 5, Column 17, Line 44, please change "according to claim 4" to -- according to claim 3 --.

Signed and Sealed this
Twenty-ninth Day of April, 2025

Coke Morgan Stewart
*Acting Director of the United States Patent and Trademark Office*